United States Patent [19]

Kishida et al.

[11] 4,388,345

[45] Jun. 14, 1983

[54] COATING COMPOSITION AND PROCESS FOR PREPARING SYNTHETIC RESIN SHAPED ARTICLES BY USING SAME

[75] Inventors: Kazuo Kishida, Otake; Isao Sasaki, Hiroshima; Kenji Kushi; Misao Tamura, both of Otake, all of Japan

[73] Assignee: Mitsubishi Rayon Company Ltd., Tokyo, Japan

[21] Appl. No.: 343,221

[22] Filed: Jan. 27, 1982

[30] Foreign Application Priority Data

Feb. 4, 1981 [JP] Japan ................................. 56-15139

[51] Int. Cl.$^3$ ............................................. B05D 3/06
[52] U.S. Cl. .............................. 427/54.1; 204/159.22; 427/44; 427/162; 427/164; 428/412
[58] Field of Search ............... 427/54.1, 44, 162, 164; 428/412; 204/159.22

[56] References Cited

U.S. PATENT DOCUMENTS

| | | | |
|---|---|---|---|
| 3,968,305 | 7/1976 | Oshima et al. | 427/44 |
| 4,199,421 | 4/1980 | Kamada et al. | 428/412 |
| 4,273,802 | 6/1981 | Kamada et al. | 428/412 |
| 4,284,685 | 8/1981 | Olson et al. | 428/412 |
| 4,319,811 | 3/1982 | Tu et al. | 428/412 |

*Primary Examiner*—John H. Newsome
*Attorney, Agent, or Firm*—Oblon, Fisher, Spivak, McClelland & Maier

[57] ABSTRACT

A shaped article of synthetic resins, such as polydiethylene glycol bisallylcarbonate, is coated with the following coating composition and then irradiated with ultraviolet rays, whereby the coating composition deposited on the shaped article is cured to form a coating film having an excellent abrasion resistance, surface smoothness, adhesion to the substrate resin, flexibility, heat resistance, solvent resistance and durability. The coating composition comprised of (a) a mixture of, based on the weight of the mixture, (i) 25-99.95 wt. % of at least one polyfunctional monomer having at least three acryloyloxy or methacryloyloxy groups, (ii) 0-50 wt. % of at least one mono- or bi-functional monomer having one or two polymerizable unsaturated groups and (iii) 0.05-25 wt. % of at least one organic acid which has at least one halogen substituent (fluorine, chlorine or bromine) and which is liquid at normal temperature and pressure, and (b) 0.01-10 wt. parts, based on 100 wt. parts of said mixture, of a photosensitizer. The coating composition may contain 0.05-25 wt. % of at least one compound having an acrylamide or methacrylamide group and a hydroxyl group or groups.

21 Claims, No Drawings

COATING COMPOSITION AND PROCESS FOR PREPARING SYNTHETIC RESIN SHAPED ARTICLES BY USING SAME

BACKGROUND OF THE INVENTION

1. Field of the Invention

This invention relates to a coating composition which provides under irradiation with ultraviolet rays, a crosslinked and cured coating film excellent in abrasion resistance, surface smoothness, flexibility, heat resistance, solvent resistance, durability and adhesion to the substrate. It also relates to a process for preparing synthetic resin shaped articles by using this coating composition, which shaped articles are excellent in abrasion resistance and adhesion and are made of polydiethylene glycol bisallylcarbonate (which may also be called "polyallyl diglycol carbonate" and is hereinafter referred to as "PDAC" for brevity).

2. Description of the Prior Art

Synthetic resin shaped articles prepared from polymethyl methacrylate resins, polystyrene resins, polycarbonate resins, PDAC resins, unsaturated polyester resins, epoxy resins and other similar resins have a light weight and are excellent in their impact resistance, and these synthetic resins are cheap and can easily be molded. Because of these various advantages, these synthetic resin shaped articles have been used in various fields and new uses of these synthetic resin shaped articles have been developed in various fields. However, these synthetic resin shaped articles are poor in abrasion resistance, and therefore, the surfaces are readily damaged by contact, abrasion or scratching with a hard article. Damage caused on the surfaces of these shaped articles lower the commercial value thereof drastically and shorten the service lives of these shaped articles. Therefore, it has eagerly been desired to improve the abrasion resistance of the surface in these synthetic resin shaped articles.

Among the synthetic resin shaped articles, PDAC resin shaped articles are advantageous in that, since PDAC resin shaped articles are prepared by cell casting, they have reduced residual molding strains and optical strains as compared with other thermoplastic resin shaped articles which are prepared by injection molding and the like. Furthermore, since PDAC resin shaped articles are cross-linkable and curable, they exhibit a relatively high surface hardness as compared with other thermoplastic resin shaped articles. Therefore, PDAC resin shaped articles have widely been used in recent years as spectacle lenses and optical lens parts. However, the abrasion resistance and surface hardness of the PDAC resin shaped articles are not completely satisfactory and, therefore, enhancement of these characteristics is eagerly desired.

Various methods have heretofore been proposed as means for eliminating the defects of various synthetic resin shaped articles. For example, there can be mentioned a method in which a coating material, comprised of a resin composition comprising a silicone or melamine type resin, is coated on the surface of a synthetic resin shaped article and then, the coating material is heated to be thereby condensed to yield a crosslinked coating film having an improved abrasion resistance on the synthetic resin shaped article, and a method in which a polyfunctional monomer, containing at least two polymerizable groups in the molecule, is coated on the surface of a synthetic resin shaped article and, then, the coated shaped article is irradiated with active energy rays to form a crosslinked and cured coating film on the surface of the synthetic resin shaped article, whereby a synthetic resin shaped article having an excellent abrasion resistance is obtained. We have already made many proposals as described in Japanese Laid-open Patent Application Nos. 102936/1978, No. 104638/1978, No. 97663/1979 and No. 97633/1979.

Although the abrasion resistance of synthetic resin shaped articles is improved by the above-mentioned methods, these methods are still not completely satisfactory. Namely, in the method wherein a coating material, such as a silicone or melamine type resin, is coated on the shaped articles and then heated to be thereby crosslinked and cured, it is necessary to heat the coating material at a high temperature over a long period of time. In the method wherein a coating material, such as a polyfunctional monomer containing at least two polymerizable groups, is coated on the shaped article and then irradiated with active energy rays to be thereby crosslinked and cured, the irradiation with active energy rays must be conducted in an atmosphere of an expensive inert gas. Furthermore, both the methods have the disadvantage that the crosslinked, cured coating film exhibits a poor adhesion, particularly to crosslinkable and curable synthetic resins, such as PDAC.

SUMMARY OF THE INVENTION

It is a primary object of the present invention to provide a coating composition capable of being cured thereby to form a coating excellent in abrasion resistance, surface smoothness, flexibility, heat resistance, solvent resistance, durability and adhesion particularly to the crosslinked plastic material.

It is another object of the present invention to provide a PDAC resin shaped article having a coating excellent in abrasion resistance and adhesion to the PDAC resin substrate.

In one aspect of the present invention, there is provided a coating composition which comprises:

(a) a mixture comprised of, based on the weight of said mixture, (i) 25 to 99.95% by weight of at least one polyfunctional monomer having at least three acryloyloxy or methacryloyloxy groups in the molecule, (ii) 0 to 50% by weight of at least one mono- or bi-functional monomer having one or two polymerizable unsaturated groups in the molecule and (iii) 0.05 to 25% by weight of at least one organic acid which has at least one halogen substituent selected from the group consisting of fluorine, chlorine or bromine and which is liquid at normal temperature and pressure, and (b) 0.01 to 10 parts by weight, based on 100 parts by weight of said mixture, of a photosensitizer.

In another aspect of the present invention, there is provided a process for preparing a PDAC resin shaped article, which comprises coating the surface of a PDAC resin shaped article with the above-mentioned coating composition and irradiating the coated shaped article with ultraviolet rays to form on the surface of the PDAC resin shaped article a crosslinked and cured film exhibiting good abrasion resistance and adhesion.

DESCRIPTION OF THE PREFERRED EMBODIMENTS

The polyfunctional monomer (i) having at least three acryloyloxy or methacryloyloxy groups in the molecule (which monomer is hereinafter referred to as "acryloyloxy or methacryloyloxy group-containing polyfunctional monomer"), used for the preparation of the coating composition of the present invention, exhibits a good curability under ultraviolet irradiation and imparts an enhanced surface hardness and abrasion resistance to the resulting coating. It is preferable for the provision of a coating having an enhanced surface hardness and abrasion resistance, that the acryloyloxy and methacryloyloxy groups in the acryloyloxy or methacryloyloxy group-containing polyfunctional monomer are bonded to each other through at least one linkage selected from the group consisting of a hydrocarbon linkage, an ether linkage and an ester linkage, said linkage having 1 to 30 carbon atoms and 0 to 10 oxygen atoms.

The acryloyloxy or methacryloyloxy group-containing polyfunctional monomers include, for example, trimethylolpropane triacrylate, trimethylolpropane trimethacrylate, trimethylolethane triacrylate, trimethylolethane trimethacrylate, pentaglycerol triacrylate, pentaglycerol trimethacrylate, pentaerythritol triacrylate, pentaerythritol trimethacrylate, pentaerythritol tetraacrylate, pentaerythritol tetramethacrylate, glycerine triacrylate and glycerine trimethacrylate.

The acryloyloxy or methacryloyloxy group-containing polyfunctional monomers also include ester compounds represented by the following general formula (I):

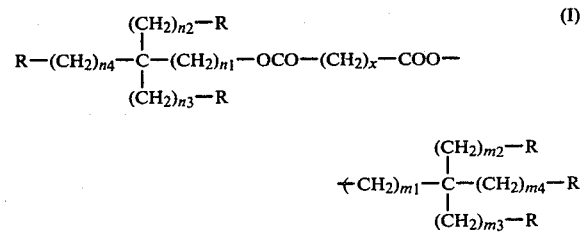

wherein at least three of the Rs are acryloyloxy groups (CH$_2$=CH.COO—) and each of the remaining is hydrogen or a hydroxyl group, $n_1$, $n_2$, $n_3$, $n_4$, $m_1$, $m_2$, $m_3$ and $m_4$ are integers of 0, 1 or 2, and x is an integer of from 1 to 10. Combinations of the reactive ingredients used for the preparation of the ester compounds of the formula (I) include, for example, malonic acid/trimethylolethane/acrylic acid, malonic acid/trimethylolpropane/acrylic acid, malonic acid/glycerin/acrylic acid, malonic acid/pentaerythritol/acrylic acid, succinic acid/trimethylolethane/acrylic acid, succinic acid/trimethylolpropane/acrylic acid, succinic acid/glycerin/acrylic acid, succinic acid/pentaerythritol/acrylic acid, adipic acid/trimethylolethane/acrylic acid, adipic acid/trimethylolpropane/acrylic acid, adipic acid/pentaerythritol/acrylic acid, adipic acid/glycerin/acrylic acid, glutaric acid/trimethylolethane/acrylic acid, glutaric acid/trimethylolpropane/acrylic acid, glutaric acid/glycerin/acrylic acid, glutaric acid/pentaerythritol/acrylic acid, sebacic acid/trimethylolethane/acrylic acid, sebacic acid/trimethylolpropane/acrylic acid, sebacic acid/glycerin/acrylic acid and sebacic acid/pentaerythritol/acrylic acid. In the preparation of the ester compounds of the formula (I), the proportion of the respective reactive ingredients used can be stoichiometrically varied provided that the resulting compounds satisfy the formula (I).

The acryloyloxy group-containing polyfunctional monomers also include polypentaerythritol polyacrylate monomers represented by the following general formula (II):

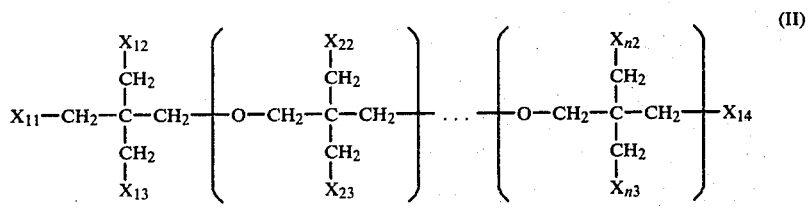

wherein at least three of $X_{11}$, $X_{12}$, $X_{13}$, $X_{22}$, $X_{23}$ ... $X_{n2}$, $X_{n3}$ and $X_{14}$ are acryloyloxy groups (CH$_2$=CH.COO—) and the remaining groups are hydroxyl groups (—OH), and n is an integer of from 2 to 5. The polypentaerythritol polyacrylate monomers of the formula (II) include, for example, dipentaerythritol triacrylate, dipentaerythritol tetraacrylate, dipentaerythritol pentaacrylate, dipentaerythritol hexaacrylate, tripentaerythritol tetraacrylate, tripentaerythritol pentaacrylate, tripentaerythritol hexaacrylate and tripentaerythritol heptaacrylate.

The above-mentioned acryloyloxy or methacryloyloxy group-containing polyfunctional monomers may be used either alone or in combination.

Among the acryloyloxy or methacryloyloxy group-containing polyfunctional monomers, polypentaerythritol polyacrylate monomers of the formula (II) are preferable because the polypentaerythritol polyacrylate monomers can be cured to the desired extent under irradiation with ultraviolet rays in air, namely, there is no need of using an inert gas.

The amount of the acryloyloxy or methacryloyloxy group-containing polyfunctional monomer (i) is in the range of from 25 to 99.95% by weight, preferably from 40 to 99.8%, based on the weight of a mixture of the acryloyloxy or methacryloyloxy group-containing polyfunctional monomer (i), the polymerizable unsaturated group-containing mono- or bi-functional monomer (ii) and the halogen substituent-having organic acid (iii). If the amount of the polyfunctional monomer (i) is smaller than 25% by weight, the cured coating does not have satisfactory abrasion resistance and surface hardness.

The polymerizable unsaturated group-containing mono- or bi-functional monomers (ii) may be any of ordinary monomers which have a radical polymerization activity. It is preferable that the polymerizable unsaturated group or groups contained in these mono- or bi-functional monomers (ii) are an acryloyloxy or methacryloyloxy group or groups, because acryloyloxy and methacryloyloxy groups exhibit a high polymerization activity under irradiation with ultraviolet rays.

As the acryloyloxy or methacryloyloxy group-containing bi-functional monomers, there can be mentioned, for example, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, 1,4-butanediol diacrylate, 1,4-butanediol dimethacrylate, 1,6-hexamediol diacrylate, 1,6-hexamediol dimethacrylate, neopentyl glycol diacrylate, neopentyl glycol dimethacrylate, propylene glycol diacrylate, propylene glycol dimethacrylate, dipropylene glycol diacrylate and dipropylene glycol dimethacrylate.

The polymerizable unsaturated group-containing bi-functional monomers also include compounds represented by the following general formula (III):

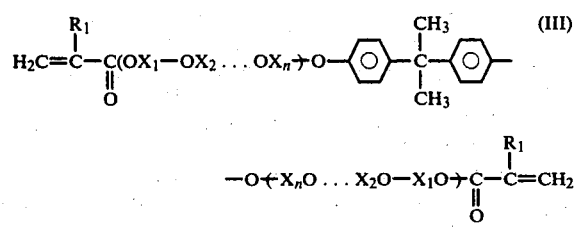

wherein $R_1$ is hydrogen or a methyl group, each of $X_1$, $X_2 \ldots X_n$ independently stands for an alkylene or hydroxyalkylene group having 1 to 6 carbon atoms which may be unsubstituted or substituted by a hydroxyl group, and n is an integer of from 0 to 5. As the compounds of the formula (III), there can be mentioned, for example, 2,2-bis(4-acryloxyphenyl)propane, 2,2-bis(4-methacryloxyphenyl)propane, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, 2,2-bis(4-acryloxypropoxyphenyl)propane, 2,2-bis(4-methacryloxypropoxyphenyl)propane, 2,2-bis[4-acryloxy(2-hydroxypropoxy)phenyl]propane, 2,2-bis[4-methacryloxy(2-hydroxypropoxy)phenyl]propane, 2,2-bis[4-acryloxy(2-hydroxypropoxyethoxy)phenyl]propane and 2,2-bis[4-methacryloxy(2-hydroxypropoxyethoxy)phenyl]propane. These acryloyloxy or methacryloyloxy group-containing compounds of the formula (III) are preferable because these compounds exhibit a high polymerization activity under irradiation with ultraviolet rays in air.

As the acryloyloxy or methacryloyloxy group-containing mono-functional monomers, there can be mentioned, for example, methyl acrylate, methyl methacrylate, propyl acrylate, propyl methacrylate, n-butyl acrylate, isobutyl acrylate, t-butyl acrylate, 2-ethylhexyl acrylate, lauryl acrylate, tridecyl acrylate, cyclohexyl acrylate, 2-hydroxyethyl acrylate, 2-hydroxypropyl acrylate, glycidyl acrylate, tetrahydrofurfuryl acrylate, benzyl acrylate, 1,4-butylene glycol monoacrylate, ethoxyethyl acrylate, ethylcarbitol acrylate, 2-hydroxy-3-chloropropyl acrylate, acrylamide, N-hydroxymethyl acrylamide, N-hydroxymethyl methacrylamide, N-hydroxyethyl acrylamide, N-hydroxyethyl methacrylamide, N-hydroxypropyl acrylamide, N-hydroxypropyl methacrylamide, N-hydroxybutyl acrylamide, N-hydroxybutyl methacrylamide, hydroxymethyl diacetone acrylamide and N-hydroxyethyl-N-(methyl)acrylamide. Of these mono-functional monomers, acrylates having a hydroxyl group and/or a cyclic ether linkage and/or a linear ether linkage are preferable because these acrylates exhibit a high polymerization activity under irradiation with ultraviolet rays in air. Such acrylates include, for example, 2-hydroxyethyl acrylate, 2-hydroxypropyl acrylate, glycidyl acrylate, tetrahydrofurfuryl acrylate, ethoxyethyl acrylate, ethylcarbitol acrylate, butoxyethyl acrylate and 1,4-butylene glycol monoacrylate.

If a compound having an acrylamide or methacrylamide group and a hydroxyl group or groups in the molecule is used, such a compound in combination with the halogen substituent-having organic acid results in a cured coating exhibiting an excellent adhesion to the substrate synthetic resin. Such compounds having an acrylamide or methacrylamide group and a hydroxyl group include, for example, N-hydroxymethyl acrylamide, N-hydroxyethyl acrylamide, N-hydroxypropyl acrylamide and hydroxymethyl diacetone acrylamide.

The amount of the polymerizable unsaturated group-containing mono- or bi-functional monomer is in the range of from 0 to 50% by weight, preferably from 0 to 40% by weight, based on the weight of the mixture of the above-mentioned acryloyloxy or methacryloyloxy group-containing polyfunctional monomer, the polymerizable unsaturated group-containing mono- or bi-functional monomer and the halogen substituent-containing organic acid. If the amount of the polymerizable unsaturated group-containing mono- or bi-functional monomer exceeds 50% by weight, the resulting cured coating is not satisfactory in surface hardness and abrasion resistance. If the above-mentioned compound having an acrylamide or methacrylamide group and a hydroxyl group or groups is used, it is preferable that the amount of this compound be in the range of from 0.05 to 25% by weight, based on the weight of the above-mentioned mixture. In such a case, the above-mentioned mixture may be comprised of, based on the weight of the mixture, (i) 25 to 99.90% by weight of the acryloyloxy or methacryloyloxy group-containing polyfunctional monomer, (ii) 0 to 49.95% by weight of the other polymerizable unsaturated group-containing mono- or bi-functional monomer, (ii') 0.05 to 25% by weight of the compound having an acryloyloxy or methacryloyloxy group and a hydroxyl group or groups and (iii) 0.05 to 25% by weight of the halogen substituent-having organic acid. More preferably, the amount of the other polymerizable unsaturated group-containing mono- or bi-functional monomer (ii) and that of the compound having an acryloyloxy or methacryloyloxy group and a hydroxyl group are 0 to 39.9% by weight and 0.1 to 15% by weight, respectively.

The above-mentioned polymerizable unsaturated group-containing mono- or bi-functional monomer imparts to the resulting cured coating an excellent adhesion to the PDAC resin substrate and excellent flexibility and smoothness.

It is preferably that the average molecular weight per polymerizable unsaturated group present in the total amount of (i) the acryloyloxy or methacryloyloxy group-containing polyfunctional monomer, (ii) the polymerizable unsaturated group-containing mono- or bi-functional monomer, and, if used, (iii) the compound having an acrylamide or methacrylamide group and a hydroxyl group or groups, be in the range of from 75 to about 300. When the above-mentioned average molecular weight per polymerizable unsaturated group is not higher than about 300 and the content of the acryloyloxy or methacryloyloxy group-containing polyfunctional monomer is within the range of from 40 to 99.8% by weight, the highest surface hardness and abrasion resistance can be attained.

It is important to incorporate in the coating composition of the present invention the organic compound which has at least one halogen substituent selected from the group consisting of fluorine, chlorine or bromine and which is liquid at normal temperature and pressure. When a coating film formed from the coating composition having such an organic compound incorporated therein, is irradiated with ultraviolet rays, the resulting cured coating film exhibits an enhanced adhesion to the substrate resin. It is surprising for the cured coating film to exhibit this enhanced adhesion, particularly to cross-linkable resins, such as PDAC. It now has been found that, when the halogen substituent-having compound is used in combination with the above-mentioned compound having an acrylamide or methacrylamide group and a hydroxyl group, the adhesion of the cured coating film to the substrate resin is more enhanced, although the particulars of the reaction mechanism cannot be elucidated.

As the halogen substituent-having organic acid, there can be mentioned, for example, difluoroacetic acid, trifluoroacetic acid, monochloroacetic acid, dichloroacetic acid, trichloroacetic acid, monobromoacetic acid, tribromoacetic acid, dichloropropionic acid and tetrachloropropionic acid. Of these, monochloroacetic acid, dichloroacetic acid and trichloroacetic acid are preferable because these three compounds are easy to handle and excellent in the adhesion-enhancing effect. These halogen substituent-having organic acids may be used either alone or in combination.

The amount of the halogen substituent-having organic acid is in the range of from 0.05 to 25% by weight, preferably from 0.1 to 20% by weight, based on the weight of the mixture of the acryloyloxy or methacryloyloxy group-containing polyfunctional monomer, the polymerizable unsaturated group-containing mono- or bi-functional monomer and the halogen substituent-having organic acid. If the amount of the halogen substituent-having organic acid is less than 0.05% by weight, the intended adhesion enhancing effect cannot be attained. In contrast, if the amount of said organic acid exceeds 25% by weight, an unreacted organic acid remains in the cured coating film and, therefore, the coating film is liable to be white in color.

In the case where the shaped article is made of crosslinkable and curable synthetic resins such as PDAC, it is often desirable to treat the shaped article with an alkali prior to the coating. By the alkali treatment, the intended effect becomes more enhanced, and the formation of defects, such as white spots, distortion, sags and gear marks on the surface of the PDAC resin lenses, can be completely avoided.

As the alkali used, hydroxide of an alkali metal of Group I of the Periodic Table is preferable. Particularly, sodium hydroxide and potassium hydroxide are advantageously used, because of their ease in handling and the enhanced effect resulting from the present invention. The alkali may be used either alone or in combination. The alkali is preferably used as an aqueous solution. If desired, the alkali may conveniently be used as a solution in a mixture of water with an organic solvent miscible with water. In order to produce PDAC shaped articles of excellent optical properties, it is especially preferable that the alkali treatment be carried out by a dipping process wherein the PDAC shaped articles are dipped in the aqueous alkali solution or the alkali solution in a water/organic solvent mixture in order.

The PDAC resin shaped articles should be treated with the alkali solution under the following conditions for attaining the intended optical properties. The concentration of an alkali metal hydroxide in the solution is preferably in the range of from 1 to 30% by weight. If the concentration of the alkali metal hydroxide is less than 1% by weight, it is necessary to treat the shaped articles in the alkali solution for a long period of time and, thus, the operating efficiency is reduced. Even if the concentration of the alkali metal hydroxide exceeds 30%, the adhesion enhancing effect would not be attained and is sometimes smaller than that attained in the concentration range of from 1 to 30% by weight.

The alkali treating temperature should preferably be in the range of from 50° to 90° C. If the temperature is lower than 50° C., the intended adhesion would not be obtained. If the temperature exceeds 90° C., it becomes difficult to precisely control the treating conditions and the operating efficiency is reduced. Particularly, when dyed PDAC resin lenses are treated at a temperature exceeding 90° C., said lenses are subject to decoloring.

The alkali treating time should preferably be in the range of from 5 to 120 seconds. If the treating time is shorter than 5 seconds, the intended adhesion cannot be obtained. If the treating time is longer than 120 seconds, the adhesion enhancing effect is almost the same and the decoloration of the dyed PDAC resin lenses becomes conspicuous. It is highly desirable to treat the shaped article at a temperature as high as possible and for a period of time as short as possible because the irradiation of the coating with ultraviolet rays can be effected within a short period of time and thus, the total period of manufacturing the final abrasion resistant shaped article can be shortened, namely, the productivity can be enhanced.

When the shaped article is treated with the alkali metal hydroxide solution by dipping the shaped article in said solution, it is preferable, for obtaining lenses excellent in surface smoothness and appearance that both the rate of introducing the shaped article into the solution and the rate of withdrawing it from the solution be maintained at a value of at least 3 cm/sec. and that the solution coated on the surface of the withdrawn shaped article be maintained so as not to be dried, at least until the coated solution is washed with water in the succeeding step. Namely, when the introducing rate and the withdrawing rate are less than 3 cm/sec., the coating film formed on the surface of the shaped article tends to be influenced by the turbulence on the free surface of the treating solution and, therefore, the resulting coated lenses are apt to have surface defects, such as turbulence, waviness and unevenness, i.e., become deteriorated in surface smoothness and appearance.

The shaped article having the coating solution deposited thereon should preferably be washed with water before the deposited coating solution dried. If the coated shaped article is washed with water after the deposited coating solution dries, it is difficult to completely wash out the alkali metal hydroxide and other deposits, and the resulting cured PDAC resin-coated shaped article is deteriorated in appearance and surface smoothness and, thus, in optical properties. Usually, the coated shaped article should preferably be washed with water within 30 seconds after it is withdrawn from the bath of the alkali metal hydroxide solution. If more than 30 seconds elapse before the coated shaped article is washed with water, the coating solution, which remains in the form of minute droplets even though the coating solution looks dried in appearance, dries and results in surface defects, such as white spots and blemish.

The above-explained conditions, under which the PDAC resin shaped article is treated with the alkali metal hydroxide solution, are important for producing a final article excellent in optical properties and adhesion between the coating film and the substrate resin, with an enhanced operation efficiency and productivity.

A photosensitizer is incorporated in the coating composition of the present invention in order to promote the curing of the coating film when the film is irradiated with ultraviolet rays.

As the photosensitizer used in the present invention, there can be mentioned, for example, carbonyl compounds, such as benzoin, benzoin methyl ether, benzoin ethyl ether, benzoin isopropyl ether, acetoin, butyroin, toluoin, benzil, benzophenone, p-methoxybenzophenone, diethoxyacetophenone, α,α-dimethoxy-α-phenylacetophenone, methylphenyl glyoxylate, ethylphenyl glyoxylate, 4,4'-bis(dimethylaminobenzophenone) and 2-hydroxy-2-methyl-1-phenylpropan-1-one; sulfur compounds such as tetramethylthiuram monosulfide and tetramethylthiuram disulfide; azo compounds such as azobisisobutyronitrile and azobis-2,4-dimethylvaleronitrile; and peroxide compounds such as benzoyl peroxide and di-tert.-butyl peroxide. These photosensitizers may be used either alone or in combination.

The photosensitizer is incorporated in an amount of 0.01 to 10.0 parts by weight based on 100 parts by weight of the mixture of (i) the acryloyloxy or methacryloyloxy group-containing polyfunctional monomer, (ii) the polymerizable unsaturated group-containing mono- or bi-functional monomer and (iii) the halogen substituent-having organic acid. If the amount of the photosensitizer is too large, coloration of the crosslinked coating film is caused and the weatherability is reduced. If the amount of the photosensitizer is too small, the curability under irradiation of ultraviolet rays is reduced.

If necessary, other vinyl monomers exhibiting a polymerizing activity under irradiation with ultraviolet rays may be incorporated in order to impart, for example, antistatic, anti-fogging and dyeing properties to the crosslinked coating film. Furthermore, appropriate amounts of additives, such as antistatic agents, ultraviolet absorbers and storage stabilizers, may be used.

Various coating methods such as brush coating, flow coating, spray coating, rotary coating and dip coating, can be adopted for coating the coating composition of the present invention on a synthetic resin shaped article. From the viewpoints of the adaptability of the coating composition to the coating operation, for smoothness and uniformity of the coating, the most recommended method is the dip coating method using an appropriate organic solvent.

The coating composition should be coated on the surface of a synthetic resin shaped article in such an amount that the thickness of the resulting cured coating film is 1 to 30 microns. If the thickness of the cured coating film is smaller than 1 micron, the surface hardness and abrasion resistance of the cured coating film are not satisfactory. If the thickness of the cured coating film is larger than 30 microns, cracking or other defects are readily caused.

The curing of the coating film is effected by irradiation with ultraviolet rays having a wave length of 1,500 to 8,000 A. The curing cannot be attained by other curing means. As the ultraviolet rays, those having a high energy and generated from a moderate, high or ultra-high pressure mercury vapor lamp are preferable.

As the synthetic resin shaped article, on which the coating composition of the present invention is coated, various synthetic resins, such as polymethyl methacrylate, polycarbonate, polystyrene, PDAC, unsaturated polyester and epoxy, can be used. However, crosslinkable and curable resins, such as PDAC, unsaturated polyester and epoxy, are preferable. Especially, PDAC is optimum as hereinbefore mentioned.

The synthetic resin shaped article may be coated as it is, or if desired, the synthetic resin shaped article can be subjected to pre-treatments such as washing, etching, corona discharge, active energy ray irradiation, dyeing and printing before being coated.

Synthetic resin shaped articles such as PDAC resin shaped articles, which have a cured coating film formed from the coating composition of the present invention, are excellent in surface smoothness, appearance, surface hardness, abrasion resistance and scratch resistance. Furthermore, the cured coating film formed on the surface of the synthetic resin shaped article is transparent, uniform and flexible and exhibits an excellent adhesion to the synthetic resin substrate. No separation of the cured coating film occurs and no cracks form in the cured coating film, even when the film is placed under severe conditions. Therefore, the synthetic resin shaped articles are advantageously used as window glass, illuminator covers, light reflectors, mirrors, eyeglass lenses, sunglass lenses and optical lenses.

The present invention will now be described in detail with reference to the following Examples that by no means limit the scope of the invention. In the Examples, parts are by weight.

The properties of crosslinked coating films were determined and evaluated according to the following methods.

(1) Abrasion resistance

A sample was lightly rubbed with a pad of steel wool of #000, and the degree of damaging of the sample surface was observed with the naked eye and the abrasion resistance was evaluated according to the following three ratings.

A: little or no scratch observed
B: slightly scratched
C: considerably scratched (2) Adhesion The cross-cut adhesive cellophane tape peel test was carried out. More specifically, eleven cuts reaching the substrate were formed on the crosslinked coating film at intervals of 1 mm in both the longitudinal and lateral directions, to form 100 square cuts each having an area of 1 mm². An adhesive cellophane tape (made by Sekisui Kagaku K.K.) was applied to the cut coating film and it was rapidly peeled off from the coating film. This test of application-and-peeling off was repeated many times on the same area of the coating film. Separation of each square and partial separation thereof were observed by using a test glass of 30× magnification.

A: neither separation nor partial separation of the squares was observed when the test was repeated for a total of ten times B: neither separation nor partial separation of the squares was observed when the test was repeated for a total of three times. Some partial separation was observed when the test was repeated for a total of ten times C: no separation of the squares was observed, but some partial separation was observed, when the test was repeated for a total of three times D: both separation and partial separation of the squares were observed when the test was repeated for a total of three times (3) Adhesion after thermal cycle After the sample was subjected to the following thermal cycle test, the adhesion was determined by the procedure described in (2) above.

Thermal cycle test: The sample was immersed in warm water of 65° C. for one hour, and immediately thereafter immersed in ice water for 10 minutes. Then, the sample was heated at 80° C. for one hour under dry conditions. This cycle was repeated for a total of five times.

(4) Optical properties

A vertically standing black screen was placed 50 cm apart from the eyes and the sample lens was placed in the center of said distance. The appearance of the lens was examined, by the naked eye, by utilizing a fluorescent light lamp which was located immediately above the screen and at a height of 25 cm higher than the height of the eyes. The appearance was evaluated according to the following three ratings.

A: no optical defects such as white spots, distortion, sags and gear marks were observed B: slight optical defects were observed C: distinct optical defects were observed

EXAMPLE 1 and COMPARATIVE EXAMPLES 1, 2 and 3

Coating compositions shown in Table I, below, were prepared. A PDAC cell-cast sheet having a thickness of 3 mm was dipped in each composition and then taken out from the composition to form a coating film thereon. In Comparative Example 3, a PDAC cell-cast sheet, which had been pre-treated with an aqueous 3% NaOH solution at 55° C., was used.

Each coated cell-cast sheet was allowed to stand for 2 minutes and, then, irradiated with ultraviolet rays emitted from high pressure mercury lamps of 2 KW in air for 15 seconds. The cured coating had the characteristics shown in Table I, below.

For comparison purpose, abrasion resistance of an uncoated PDAC cell-cast sheet was evaluated. Conspicuous scratches were observed even when the uncoated PDAC cell-cast sheet was only lightly rubbed.

TABLE I

| | | Ex. 1 | Comp. Ex. 1 | Comp. Ex. 2 | Comp. Ex. 3 |
|---|---|---|---|---|---|
| Coating composition (parts) | 2P6A*1 | 40 | 40 | 40 | 40 |
| | 2P5A*2 | 30 | 30 | 30 | 30 |
| | THF—A*3 | 12 | 12 | 12 | 12 |
| | N—HAM*4 | — | — | 18 | — |
| | DCAA*5 | 18 | — | — | — |
| | BEE*6 | 2 | 2 | 2 | 2 |
| | BNP*7 | 3 | 3 | 3 | 3 |
| | iso-PrOH*8 | 100 | 100 | 100 | 100 |
| | Toluene | 50 | 50 | 50 | 50 |
| Abrasion resistance | | A | A | A | A |

TABLE I-continued

| | Ex. 1 | Comp. Ex. 1 | Comp. Ex. 2 | Comp. Ex. 3 |
|---|---|---|---|---|
| Adhesion | B | C | C | B ~ C |

*1 2P6A: Dipentaerythritol hexaacrylate
*2 2P5A: Dipentaerythritol pentaacrylate
*3 THF—A: Tetrahydrofurfuryl acrylate
*4 N—HAM: N—hydroxymethyl-acrylamide
*5 DCAA: Dichloroacetic acid
*6 BEE: Benzoin ethyl ether
*7 BNP: Benzophenone
*8 iso-PrOH: Isopropyl alcohol

EXAMPLES 2 AND 3

Coating compositions shown in Table II, below, were prepared. A PDAC cell-cast sheet having a thickness of 2 mm was coated with each coating composition by a dipping procedure. The coated cell-cast sheet was allowed to stand for 2 minutes and, then, irradiated with ultraviolet rays emitted from high pressure mercury lamps of 5 KW for 10 seconds. The cured coating had the characteristics shown in Table II, below.

TABLE II

| | PDAC sheet | Ex. 2 Non-alkali treated | Ex. 3 Alkali*9 treated |
|---|---|---|---|
| Coating composition (parts) | 2P6A | 30 | 30 |
| | 2P5A | 30 | 30 |
| | 2P4A*10 | 16 | 16 |
| | THF—A | 12 | 12 |
| | N—HAM | 4 | 4 |
| | DCAA | 8 | 8 |
| | DMPA*11 | 5 | 5 |
| | iso-PrOH | 150 | 150 |
| Abrasion resistance | | A | A |
| Adhesion | | A | A |
| Adhesion after thermal cycle | | B | A |

*9 Treated with an aqueous 10% NaOH solution at 80° C. for one minute.
*10 2P4A: Dipentaerythritol tetraacrylate
*11 DMPA: α,α-Dimethoxy-α-phenylacetophenone

EXAMPLE 4

A PDAC lens was treated with an aqueous 10% NaOH solution at 80° C. for 2 minutes. The alkali-treated lens was uniformly coated by a dipping procedure with a coating composition comprised of 35 parts of dipentaerythritol hexaacrylate, 40 parts of dipentaerythritol pentaacrylate, 10 parts of tetrahydrofurfuryl acrylate, 8 parts of 2,2-bis—4-acryloxydiethoxyphenyl—propane, 3 parts of N-(hydroxymethyl)acrylamide, 4 parts of dichloroacetic acid, 3 parts of benzoin isopropyl ether, 3 parts of benzophenone and 150 parts of isopropyl alcohol. The coated lens was allowed to stand for 2 minutes and, then, irradiated with ultraviolet rays emitted from high pressure mercury lamps of 2 KW in air for 15 seconds. The cured coating had the following characteristics.

Abrasion resistance: A
Adhesion after thermal cycle: A

EXAMPLE 5

A clear PDAC lens was dipped in an aqueous 5% KOH solution at a dipping speed of 5 cm/sec. and at 70° C. for 90 seconds, and immediately thereafter, washed with water and then hydro-extracted. Then, the lens was dipped at a dipping speed of 0.2 cm/sec. in a coating solution comprised of 10 parts of dipentaerythritol pentaacrylate, 10 parts of dipentaerythritol hexaacrylate, 5 parts of tetrahydrofurfuryl acrylate, 4 parts of 2,2-bis—4-acryloxydiethoxyphenyl—propane, 1 part of N-(hydroxymethyl)-acrylamide, 60 parts of ethanol, 9 parts of toluene, 1 part of dichloroacetic acid, 0.5 part of benzoin ethyl ether, 0.5 part of p-chlorobenzophenone and 0.1 part of a silicone leveling agent. The coated lens was irradiated with ultraviolet rays emitted from high pressure mercury lamps of 5 KW located at positions a distance of 250 mm from the coated lens, for 10 seconds.

The cured coating had the following characteristics.
Abrasion resistance: A
Adhesion after thermal cycle: A
Optical properties: A parts of dipentaerythritol tetraacrylate, 6 parts of tetrahydrofurfuryl acrylate, 1 part of N-(hydroxymethyl)-acrylamide, 50 parts of isopropyl alcohol, 15 parts of isobutanol, 9 parts of amyl acetate, 1 part of dichloroacetic acid, 0.3 part of benzoin isopryl ether, 0.7 part of benzophenone and 0.2 part of a silicone leveling agent. The coated lenses were irradiated with ultraviolet rays emitted from high pressure mercury lamps of 2 KW located at positions a distance of 200 mm from the coated lens, in air for 13 seconds.

The cured coating had the characteristics shown in Table III, below.

TABLE III

| Alkali-treating conditions | | Ex. 7 | Ex. 8 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| Aqueous NaOH solution | Concentration (wt. %) | 10 | 15 | — | 0.1 | 10 | 10 | 10 | 10 | 10 |
| | Temp. (°C.) | 80 | 75 | — | 80 | 25 | 80 | 80 | 80 | 80 |
| | Time (sec) | 20 | 30 | — | 20 | 20 | 0.1 | 180 | 20 | 20 |
| Dipping speed (cm/sec) (both introduction and withdrawal) | | 5 | 6 | — | 5 | 5 | 5 | 5 | 0.5 | 5 |
| Time period from withdrawal from dipping bath to washing with water (sec) | | 10 | 10 | — | 10 | 10 | 10 | 10 | 10 | 180 |
| Abrasion resistance | | A | A | A | A | A | A | A | A | A |
| Adhesion after thermal cycle | | A | A | B | B | B | B | A | A | A |
| Appearance (optical properties) | | A | A | A | A | A | A | A* | C | C |

*Lens was conspicuously declored.

EXAMPLE 6

A clear PDAC lens was dipped in an aqueous 20% NaOH solution at a dipping speed of 6 cm/sec. and at 85° C. for 30 seconds, and immediately thereafter, washed with water and then hydro-extracted. Then, the lens was dipped at a dipping speed of 0.3 cm/sec. in a coating solution comprised of 5 parts of dipentaerythritol hexaacrylate, 5 parts of dipentaerythritol pentaacrylate, 5 parts of dipentaerythritol tetraacrylate, 6 parts of tetrahydrofurfuryl acrylate, 2 parts of an ester prepared from adipic acid/trimethylolpropane/acrylic acid, 2 parts of N-(hydroxymethyl)-acrylamide, 50 parts of isopropyl alcohol, 10 parts of isobutyl alcohol, 10 parts of hexane, 5 parts of dichloroacetic acid, 0.5 part of benzoin methyl ether, 1.0 part of benzophenone and 0.1 part of a silicone leveling agent. The coated lens was irradiated with ultraviolet rays emitted from high pressure mercury lamps of 2 KW located at positions a distance of 200 mm from the coated lens, in air for 15 seconds.

The cured coating had the following characteristics.
Abrasion resistance: A
Adhesion after thermal cycle: A
Optical properties: A

EXAMPLES 7 AND 8 AND COMPARATIVE EXAMPLES 4 THROUGH 10

Plano-dyed PDAC lenses were treated with an aqueous NaOH solution under conditions shown in Table III, below. After being hydro-extracted, each lens was dipped at a dipping speed of 0.3 cm/sec. in a coating solution comprised of 8 parts of dipentaerythritol hexaacrylate, 5 parts of dipentaerythritol pentaacrylate, 5

We claim:
1. A coating composition which comprises:
   (a) a mixture comprised of, based on the weight of said mixture, (i) 25 to 99.95% by weight of at least one polyfunctional monomer having at least three acryloyloxy or methacryloyloxy groups in the molecule, (ii) 0 to 50% by weight of at least one mono- or bi-functional monomer having one or two polymerizable unsaturated groups in the molecule and (iii) 0.05 to 25% by weight of at least one organic acid which has at least one halogen substituent selected from the group consisting of fluorine, chlorine or bromine and which is liquid at normal temperature and pressure, and
   (b) 0.01 to 10 parts by weight, based on 100 parts by weight of said mixture, of a photosensitizer.
2. A coating composition which comprises:
   (a) a mixture comprised of, based on the weight of said mixture, (i) 25 to 99.90% by weight of at least one polyfunctional monomer having at least three acryloyloxy or methacryloyloxy groups in the molecule, (ii) 0 to 49.95% by weight of at least one mono- or bi-functional monomer having one or two polymerizable unsaturated groups in the molecule, (iii) 0.05 to 25% by weight of at least one compound having an acrylamide or methacrylamide group and a hydroxyl group in the molecule and (iv) 0.05 to 25% by weight of at least one organic acid which has at least one halogen substituent selected from the group consisting of fluorine, chlorine or bromine and which is liquid at a normal temperature and pressure, and

(b) 0.01 to 10 parts by weight, based on 100 parts by weight of said mixture, of a photosensitizer.

3. A coating composition according to claim 1 wherein the average molecular weight per polymerizable unsaturated group present in the total amount of (i) the polyfunctional monomer containing at least three acryloyloxy or methacryloyloxy groups and (ii) the polymerizable unsaturated group-containing mono- or bi-functional monomer is not higher than about 300.

4. A coating composition according to claim 2 wherein the average molecular weight per polymerizable unsaturated group present in the total amount of (i) the polyfunctional monomer containing at least three acryloyloxy or methacryloyloxy groups, (ii) the polymerizable unsaturated group-containing mono- or bi-functional monomer and (iii) said compound having an acrylamide or methacrylamide group and a hydroxyl group or groups is not higher than about 300.

5. A coating composition according to claim 1 or 2 wherein the acryloyloxy and methacryloyloxy groups in the polyfunctional monomer containing at least three acryloyloxy or methacryloyloxy groups are bonded to each other through at least one linkage selected from the group consisting of a hydrocarbon linkage, an ether linkage or an ester linkage, said linkage having 1 to 30 carbon atoms and 0 to 10 oxygen atoms.

6. A coating composition according to claim 1 or 2 wherein the mono- or bi-functional monomer has an acryloyloxy or methacryloyloxy group or groups as the polymerizable unsaturated group or groups.

7. A coating composition according to claim 2 wherein said compound having an acrylamide or methacrylamide group and a hydroxyl group or groups in the molecule is selected from the group consisting of N-hydroxymethyl acrylamide, N-hydroxyethyl acrylamide, N-hydroxylpropyl acrylamide and hydroxymethyl diacetone acrylamide.

8. A coating composition according to claim 1 or 2 wherein the halogen substituent-having organic acid is selected from the group consisting of monochloroacetic acid, dichloroacetic acid and trichloroacetic acid.

9. A process for the preparation of a synthetic resin shaped article made of polydiethylene glycol bisallylcarbonate, which comprises coating the surface of a synthetic resin shaped article made of polydiethylene glycol bisallylcarbonate with a coating composition and irradiating the coated shaped article with ultraviolet rays to form on the surface of the synthetic resin shaped article a crosslinked and cured film exhibiting good abrasion resistance and adhesion, wherein said coating composition comprises:
(a) a mixture comprised of, based on the weight of said mixture, (i) 25 to 99.95% by weight of at least one polyfunctional monomer having at least three acryloyloxy or methacryloyloxy groups in the molecule, (ii) 0 to 50% by weight of at least one mono- or bi-functional monomer having one or two polymerizable unsaturated groups in the molecule and (iii) 0.05 to 25% by weight of at least one organic acid which has at least one halogen substituent selected from the group consisting of fluorine, chlorine or bromine and which is liquid at a normal temperature and pressure, and
(b) 0.01 to 10 parts by weight, based on 100 parts by weight of said mixture, of a photosensitizer.

10. A process for the preparation of a synthetic resin shaped article made of polydiethylene glycol bisallylcarbonate, which comprises coating the surface of a synthetic resin shaped article made of polydiethylene glycol bisallylcarbonate with a coating composition and irradiating the coated shaped article with ultraviolet rays to form, on the surface of the synthetic resin shaped article, a crosslinked and cured film exhibiting good abrasion resistance and adhesion, wherein said coating composition comprises:
(a) a mixture comprised of, based on the weight of said mixture, (i) 25 to 99.90% by weight of at least one polyfunctional monomer having at least three acryloyloxy or methacryloyloxy groups in the molecule, (ii) 0 to 49.95% by weight of at least one mono- or bi-functional monomer having one or two polymerizable unsaturated groups in the molecule, (iii) 0.05 to 25% by weight of at least one compound having an acrylamide or methacrylamide group and a hydroxyl group or groups in the molecule and (iv) 0.05 to 25% by weight of at least one organic acid which has at least one halogen substituent selected from the group consisting of fluorine, chlorine or bromine and which is liquid at a normal temperature and pressure, and
(b) 0.01 to 10 parts by weight, based on 100 parts by weight of said mixture, of a photosensitizer.

11. A process according to claim 9 wherein the average molecular weight per polymerizable unsaturated group present in the total amount of (i) the polyfunctional monomer containing at least three acryloyloxy or methacryloyloxy groups and (ii) the polymerizable unsaturated group-containing mono- or bi-functional monomer is not higher than about 300.

12. A process according to claim 10 wherein the average molecular weight per polymerizable unsaturated group present in the total amount of (i) the polyfunctional monomer containing at least three acryloyloxy or methacryloyloxy groups, (ii) the polymerizable unsaturated group-containing mono- or bifuntional monomer and (iii) said compound having an acrylamide or methacrylamide group and a hydroxyl group or groups is not higher than about 300.

13. A process according to claim 9 or 10 wherein the acryloyloxy and methacryloyloxy groups in the polyfunctional monomer containing at least three acryloyloxy or methacryloyloxy groups are bonded to each other through at least one linkage selected from the group consisting of a hydrocarbon linkage, an ether linkage and an ester linkage, said linkage having 1 to 30 carbon atoms and 0 to 10 oxygen atoms.

14. A process according to claim 9 or 10 wherein the mono- or bi-functional monomer has an acryloyloxy or methacryloyloxy group or groups as the polymerizable unsaturated group or groups.

15. A process according to claim 10 wherein said compound, having an acrylamide or methacrylamide group and a hydroxyl group or groups in the molecule, is selected from the group consisting of N-hydroxymethyl acrylamide, N-hydroxyethyl acrylamide, N-hydroxylpropyl acrylamide and hydroxymethyl diacetone acrylamide.

16. A process according to claim 9 or 10 wherein the halogen substituent-having organic acid is selected from the group consisting of monochloroacetic acid, dichloroacetic acid and trichloroacetic acid.

17. A process according to claim 9 or 10 wherein the polydiethylene glycol bisallylcarbonate shaped article is treated with an alkali prior to said coating.

18. A process according to claim 17 wherein said alkali treatment is carried out by using an aqueous sodium hydroxide or potassium hydroxide solution having a concentration of from 1 to 30% by weight at a temperature of from 50° to 90° C.

19. A process according to claim 18 wherein said alkali treatment is carried out by dipping the polydiethylene glycol bisallylcarbonate shaped article in said aqueous sodium hydroxide or potassium hydroxide solution for a period of from 5 to 120 seconds wherein said shaped article is introduced into and withdrawn from said aqueous alkali solution at a rate of at least 3 cm/sec.

20. A process according to claim 18 or 19 wherein the polydiethylene glycol bisallylcarbonate shaped article coated with the aqueous sodium hydroxide or potassium hydroxide solution is washed with water before said aqueous alkali solution deposited on the surface of said shaped article dries.

21. A process according to claim 20 wherein said washing with water is carried out within 30 seconds from the withdrawal of said shaped article from said aqueous alkali solution.

* * * * *